United States Patent Office 2,704,057
Patented Mar. 15, 1955

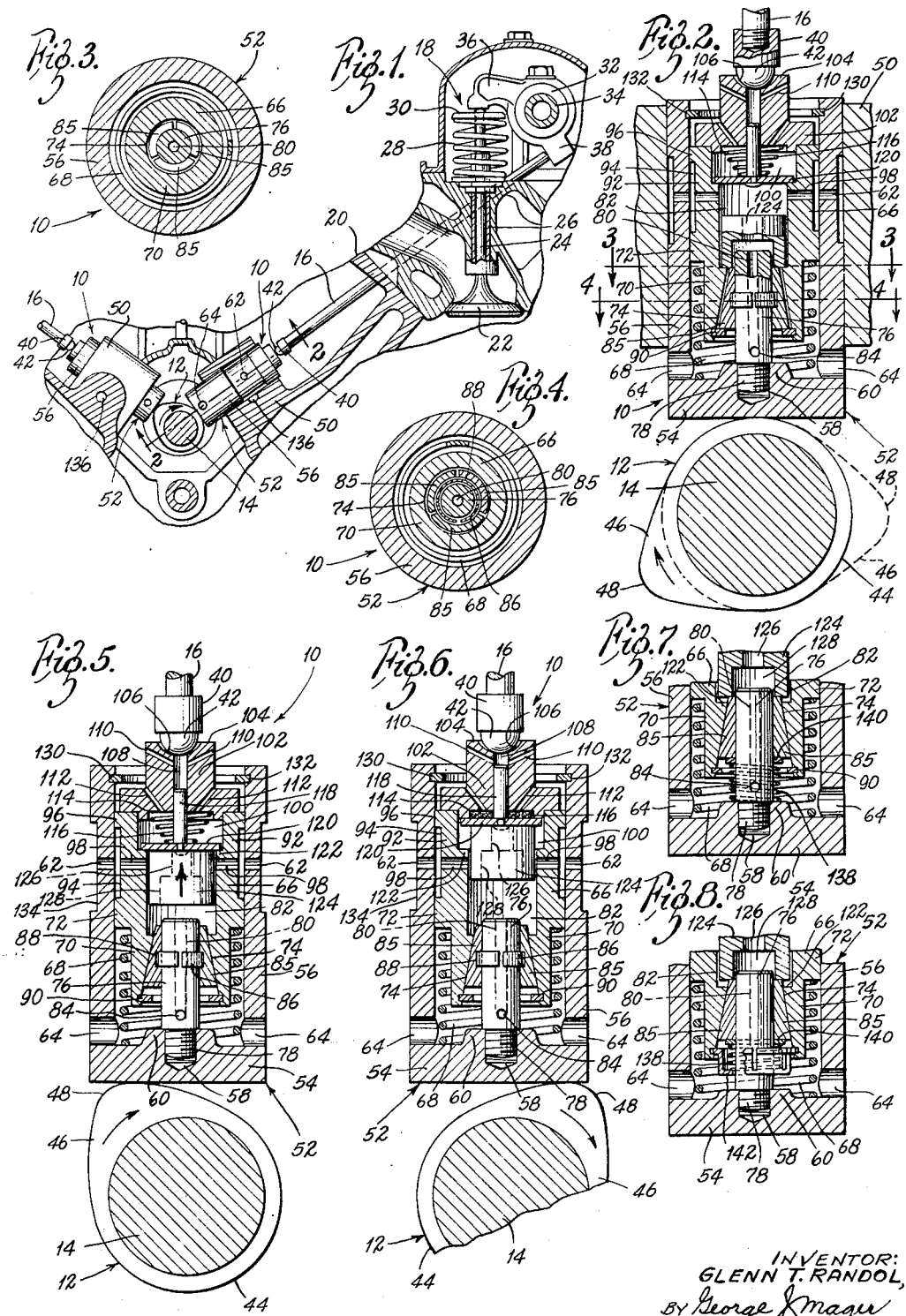

2,704,057

MECHANICAL SELF-ADJUSTING VALVE LIFTER

Glenn T. Randol, Mountain Lake Park, Md.

Application June 8, 1953, Serial No. 360,235

24 Claims. (Cl. 123—90)

The present invention relates to an improved valve lifter or tappet assembly of the mechanical type adapted for incorporation in the valve-drive linkage of a conventional internal-combustion engine.

More particularly, the instant invention relates to a novel valve lifter or tappet assembly interposed between the cam shaft and the stem of a poppet valve operating linkage, said assembly including means for automatically extending and contracting the linkage whereby to maintain substantially a constant predetermined adjustment therein, and for automatically and instantaneously absorbing any backlash which may be present or which may develop in said linkage over and above a requisite operational clearance therein.

Specifically, this invention concerns an inertia hammer and wedge-coupling combination incorporated in a self-contained valve lifter assembly or unit, which is slidably mounted in a cylindrical portion of a conventional internal-combustion engine between a cam on the engine camshaft, and the lower end of a push rod or valve stem included in the drive train of a poppet valve.

Broadly, the instant valve lifter unit includes: a reciprocable cup-shaped piston or outer member; a plunger or inner member slidable in the piston member; compression spring means for biasing the plunger upwardly into constant engagement with the downwardly biased push rod or stem of a poppet valve operating linkage; retaining means for limiting the upward movement of said plunger; a conical clutch assembly adapted to interlock the piston and plunger for unison movement thereof during a valve opening operation; a hammer member operative in a cylindrical bore of the plunger adapted to unlock said piston and plunger during a valve closing operation; means for lubricating the moving parts of the unit; and other cooperating and inter-related elements as will appear.

The conical clutch assembly or coupling includes a series of wedge elements disposed in close surrounding relationship, about a cylindrical member rigidly mounted centrally in the bottom wall of the piston or outer body member, and which projects upwardly therefrom. A split retainer ring, in frictional engagement with said cylindrical member and extending into an annular internal groove provided therefor in each wedge element, serves to prevent axial displacement of the wedge elements relatively to one another. The external surfaces of the wedge elements form conically disposed clutch faces adapted for clutching engagements with a corresponding clutch face formed internally of the plunger. When such engagement is effected as will appear, said piston and plunger move conjointly at the inauguration of an engine valve opening operation, but move independently when, immediately subsequent to or at a valve closing operation, an impact blow delivered by the hammer member to the wedge elements in cooperation with or independently of the action of the aforesaid compression spring means causes clutch-disengagement, thereby enabling the lifter mechanism to automatically adjust the drive linkage so as to eliminate any undesirable backlash therein prior to the succeeding valve opening operation.

The primary object of my invention therefore, is to provide a mechanical valve lifter including means automatically extensible and contractible responsive to the free reciprocal movements of an intertia hammer member relatively to a wedge-clutch assembly, for maintaining only the desired operational clearance in a valve drive linkage irrespective of the thermal condition of an internal-combustion engine.

It is another important object to achieve the primary object of the invention by the provision of an inertia hammer member having a free movement in an upward direction, and an operative impact movement in a downward direction responsive to the motion of the lifter unit.

Another object of the invention is to provide a mechanical valve lifter of the self-adjusting type wherein two members normally movable relatively to one another are interlocked for conjoint movement in the course of a valve opening operation by means of a wedge-clutch assembly, and unlocked for independent movement relatively by means of an inertia hammer member in the course of a valve closing operation.

A further object of the invention is to provide an inertia hammer and wedge-clutch arrangement for a mechanical valve lifter wherein the hammer delivers an axial blow to the wedge-clutch elements for declutching them only following the complete closing of the engine valve actuated by said lifter.

A further object is to provide means for lubricating the valve lifter of the present invention in a manner to effect quiet and efficient operability thereof. To this end, oil passages are provided for the inertia hammer adapted not only to efficiently lubricate it and the mechanism associated therewith, but also adapted to relieve the lifter of all compression effects, whereby a full impact force of the hammer is assured at all times.

It is another object of this invention to provide an automatically adjustable, mechanically operable valve lifter assembly in the form of a novel self-contained unit, thus facilitating the disposition thereof in an engine between the camshaft and the lower extremity of the push rod or valve stem of a conventional poppet valve linkage.

Another object of the invention is to provide a valve lifter unit designed to eliminate the need for manual tappet adjustments by novel automatic compensation for wear in the components of the valve drive train.

Objects and advantages not specifically set forth hereinbefore, will be noted in the course of the detailed description of the invention to follow with reference to the accompanying sheet of drawings, wherein the preferred embodiment and slightly modified embodiments are illustrated.

In the drawings:

Figure 1 is a fragmentary view, partly in elevation and partly in section, of an internal-combustion engine and its valve drive linkage, the view demonstrating the disposition of the present self-adjusting lifter assembly between the engine camshaft and the lower end of the push rod included in said linkage;

Figure 2 is an enlarged longitudinal sectional view through the lifter assembly taken substantially on the line 2—2 of Figure 1, with the camshaft positioned substantially 90° to the plane of the longitudinal section;

Figures 3 and 4 are transverse sectional views through the lifter assembly taken respectively on the lines 3—3 and 4—4 of Figure 2;

Figure 5 is a view similar to Figure 2, exhibiting the changed status of certain parts of the lifter assembly responsive to another position of the camshaft;

Figure 6 is a view similar to Figure 5, exhibiting a further changed status of certain parts of the lifter assembly responsive to a different position of said camshaft;

Figure 7 is a fragmentary sectional view illustrating a slightly modified embodiment of the invention; and Figure 8 is a view similar to Figure 7 illustrating another slight modification relatively to that portrayed in said Figure 7.

Referring to the drawing, the self-adjusting valve lifter assembly comprising the present invention is designated in its entirety by the numeral 10. It is a self-contained unit interposed between the cam 12 of an engine camshaft 14, and the push-rod 16 of a conventional valve-drive train or linkage generally designated 18.

With particular reference to Figure 1, the lifter assembly 10 is shown incorporated in an internal-combustion engine 20 of the V-type, but it is to be understood that the invention is not limited to use in engines of that type.

Numeral 22 designates a poppet valve, the stem 24 of which is slidably mounted in a stationary sleeve 26 as shown. The valve 22 is normally biased to its illustrated closed position by means of a compression spring 28 interposed about said valve stem between the sleeve supporting portion of said engine and a spring seat 30, as is well understood. The thus far described valve construction is conventional, as is the rocker arm 32 associated therewith. Said rocker arm is pivotally mounted on an oil distribution pipe 34 of the engine, and includes a segment 36 in engagement with the upper extremity of the valve stem 24, and an opposing segment 38 in engagement with the upper extremity of the push rod 16. The lower extremity of said push rod is equipped with an adjustable fitting 40 including a depending substantially semi-spherical segment 42, as seen to best advantage in Figure 2. The cam 12, in conventional fashion, includes a base circle portion 44 and a lobe portion 46, the rounded apex of said lobe portion being designated 48.

The valve lifter assembly is a self-contained unit, and when in position is slidably mounted in a conventional cylinder portion 50 of the engine, as shown in Figures 1 and 2. Said assembly or unit includes a cup-shaped outer member or piston 52, having a bottom wall 54 and a cylindrical side wall 56. A threaded socket 58 surrounded by an upstanding annular flange 60 is integrally formed centrally in said bottom wall, and the side wall 56 is provided with a series of radial oil intake ports 62 and a series of radial oil drainage ports 64, for a reason to appear.

Numeral 66 indicates a hollow plunger slidably mounted in the piston member 52, which is biased upwardly by means of a compression spring 68 interposed about the lower end segment 70 of said plunger between a circular flange 72 thereon, and the piston bottom wall 54. The plunger 66 is hollow as noted, and said lower segment 70 has formed therein a conical clutch cavity 74 through which a pin 76 extends. Said pin terminates at its lower end in a reduced threaded shank portion 78 in engagement with the socket 58 as shown. Formed in pin 76 is a longitudinal passageway 80 in fluid communication at its upper end with a cylindrical bore 82 in said plunger, and at its lower end with a diametrical port 84 in said pin.

Slidably disposed in the conical clutch cavity 74 about the pin 76 is a wedge-clutch assembly comprising a plurality of conical clutch elements 85, three being illustrated exemplarily, as best seen in Figure 3. A split collar 86, in frictional engagement with said pin, also engages in an internal groove 88 formed in each clutch element 85, whereby to maintain the group of said elements in proper circular alignment. Numeral 90 designates a split retainer ring seated in an annular internal groove provided therefor in the plunger segment 70 near the lower end thereof.

The upper end segment of plunger 66 is designated 92 and has formed therein an external recess or annular groove 94 between the circular flange 72 and a similar top flange 96. A series of radial passageways 98 is provided in the plunger whereby to establish fluid communication between the bore 82 and the interior of the piston member 52.

At its upper end, the bore 82 opens into a counterbore 100 closed by a cap member 102. This cap member terminates at its upper end in an upwardly projecting segment 104 having a socket 106 therein for the reception of a semi-spherical segment 42 on the lower end of the push-rod. It is noted at this point, that the cumulative forces of the compression springs 28 and 68 serve to maintain the cap member 102 in sealing engagement against the plunger flange 96 at all times, as should be evident.

The configuration of the cap member 102 is clearly demonstrated in the drawings where it is seen to include a central longitudinal bore 108; a first series of angularly disposed passageways 110 leading from bore 108 to atmosphere; a second series of angularly disposed passageways 112 leading from plunger counterbore 100 to atmosphere; and an annular depression or recess 114 formed centrally in its undersurface to provide a seat for a light predeterminately pretensioned conical snubber spring 116. The spring 116 is normally disposed in counterbore 100 about a stem 118 slidable in bore 108, between the spring seat 114 aforesaid and a disc 120 secured to the lower end of said stem. The spring 116 is of the compression type, and normally maintains the disc 120, which is reciprocable in counterbore 100, in engagement with an annular plunger shoulder 122 resulting from the mergence of said counterbore and the bore 82, as demonstrated in Figures 2 and 5.

Numeral 124 designates an unsupported or floating inertia hammer member reciprocable in cylindrical bore 82 of the plunger 66, as will appear. Said hammer member is bored at 126, and counterbored at 128, the bore 126 accommodating reception of the peened over end of the pin 118, and the counterbore 128 freely accommodating the upper end of the pin 76.

As previously noted, the assembly 10 constitutes a self-contained unit whereby removal for repair and replacement operations are facilitated. To this end, a split retainer ring 130 is seated in an annular internal groove 132 provided therefor adjacent the upper end of the piston wall 56. Preferably, said piston wall is provided with an annular recess 134 in the region of the ports 62, and the cylinder portion 50 of the engine block has formed therein a transverse oil passage 136 in fluid communication with said recess, for reasons to be explained.

In the modified construction portrayed in Figure 7, a helical spring 138 is interposed about the pin 76 between the upstanding flange 60 and a washer 140 which engages the undersides of the wedge-clutch elements 85. With this arrangement, the split resilient collar 86 and the internal grooves 88 are dispensed with, spring 138 serving to maintain the clutch elements in axial alignment, as should be obvious. Parts appearing in this view and also in Figure 8 which correspond to those of the main form, are identified by similar reference characters.

The modified construction appearing in Figure 8 is similar to that of Figure 7, with one exception. That is to say, the sectioned retainer ring 90 is replaced by a split cup member 142 against which the helical spring 138 seats as clearly shown.

Operation

With particular reference now to Figures 1 through 6, it will be assumed that the engine is in operation, and that the camshaft 14 rotates clockwise as indicated by the arrows. With the lifter assembly 10 riding on the base circle portion 44 of the cam 12, the lifter mechanism is in the normally relaxed condition thereof illustrated in Figure 2. That is to say, the compression spring 68 interposed between piston 52 and plunger 66 has accommodated the adjustment of the valve drive linkage 18 following the cooperative action of said spring with the impact of hammer 124 in declutching the wedge elements, in a manner to remove substantially any backlash which may have existed therein subsequent to the preceding closing of the valve 22. In such relaxed condition of the mechanism, the inertia hammer 124 rests on the upper edges of the wedge-clutch elements 85, the latter being supported in circular alignment about the pin 76 by the retainer ring 90. As a result, a slight circumferential clearance is in evidence between the confronting conical clutch faces of the plunger 66 and said wedge elements 85.

It is noted that this circumferential or what may be termed operating clearance, remains substantially constant irrespective of thermal or wear conditions. This constant characteristic is in consequence of the uniform spacing normally obtaining between the wedge-elements 85 and the conical clutch surface of the plunger cavity 74.

Continued rotation of the cam 12, will bring the lobe portion 46 thereof into engagement with the bottom wall 54 of piston 52 as shown in Figure 5, thus actuating the valve 22 toward almost fully open position. At such time, as the arrow thereon indicates, the inertia hammer 124 is traveling upwardly and is approaching the limit of its upward travel.

Initial engagement of the lobe 46 with the piston 52 causes the wedge clutch assembly to instantly impinge around the pin 76 in consequence of the resultant engagement of the complementary conical clutch surfaces of the wedge elements 85 and the plunger 66. The aforesaid coaction thus locks the piston 52 and plunger 66 for unison movement in opening the valve 22 as cam 12 rotates from the full line Figure 2 position to the Figure 5 position thereof. As the engine valve passes through its full open position and is beginning to close, the apex portion 48 of cam 12 passes from the Figure 5 to the Figure 6 position thereof while the inertia hammer floats in its uppermost position due to the lifter motion. As a result, the disc 120 has been propelled, in unison with the final upward travel of the hammer, into engagement with the annular shoulder surrounding the seat 114 for the upper end of the conical compression spring 116, thus compressing the latter with the coils thereof in substantially the same plane, to cushion the impact of the hammer upstroke.

As the cam 12 continues its rotation from the position thereof shown in Figure 6, the valve 22 closes at substantially that point in cam rotation at which the lobe portion 46 merges into the base circle portion 44.

Since the inertia hammer 124 begins its descent at some point before the piston bottom wall comes into contact with the closing ramp angle of the cam 14, said hammer is concurrently moving toward the wedge-clutch assembly with maximum velocity, initially accelerated by the released biasing force of the snubber spring 116. As the valve 22 closes, the hammer 124 strikes the upper ends of the elements 85, whereby to dislodge them from clutching engagement with the plunger 66, so that with the lifter unit now riding the base circle portion 44 of the cam, all elements of the mechanism revert to the normal relaxed condition thereof exhibited in Figure 2, for a repetition of the described valve opening cycle.

It is noted that following the declutching operations by the hammer in cooperation with the action of spring 68, the valve lifter automatically adjusts itself to changes in length requirements in consequence of changing temperature or wear conditions, or both, by reason of the inherent action of spring 68. Thus, the aforesaid cooperative action between the spring 68 and inertia hammer 124 is effective, after the piston 52 engages the base circle of the cam 14, to declutch the wedge elements, said spring action tending to separate the wedge elements from their complemental clutching surfaces on the piston member aforesaid with consequent relatively light impact force being required of the hammer 124 in effecting clutch disengagement. It is further noted that the lifter unit now rides the base circle portion 44 of the cam in perfectly adjusted condition wherein zero-clearance obtains substantially in the valve drive linkage, and a desirable established operating clearance obtains in the lifter mechanism, the last-named clearance being defined by the circumferential space between the complemental conical clutch faces of the wedge elements and the plunger. The resilient split collar 86 accommodates relative adjustments between the piston and plunger members, and the static weight of the hammer prevents loss of the operating clearance after the elements 85 have been declutched, as demonstrated in Figure 2.

The frictional coefficient between the said split collar 86 and the pin 76 is only sufficient to cause the wedge elements and the hammer to move in unison with said pin when initially thrust upwardly upon inauguration of a valve opening cycle. However, it is to be noted that the velocity of the hammer into impact with the wedge elements is greater than the weight of the hammer at rest. Therefore, the frictional engagement of the split collar is not sufficient to prevent any required relative adjustment between piston and plunger during a declutching operation by the hammer. After the hammer comes to its Figure 2 position of rest, the clamping action of the collar 86 on the pin 76 is effective to move upwardly the wedge elements and the hammer, the latter thereupon moving rapidly away from the pin and said wedge elements in consequence of the motion of the lifter unit.

With particular reference now to Figures 7 and 8, the slightly modified constructions there appearing may be embodied in a valve lifter 10 otherwise identical with that described. Each of these views shows the parts in disposition obtaining at the instant of inaugurating a valve opening operation responsive to the opening ramp on the cam 12 engaging the bottom wall 54 of the piston 52 immediately prior to the valve opening operation of the lifter as shown in Figure 5. This disposition of elements consequently correspond substantially to that illustrated in said figure in connection with the main embodiment except that the inertia hammer 124 is at the instant of beginning its upward throw responsive to ensuing tappet motion, and was brought about in the manner to now appear.

It will be remembered from the earlier description of operation, that upon the lifter unit 10 being relaxed with the valve 22 completely closed, the spring 68 became effective to accommodate any relative adjustment between the piston 52 and the plunger 66. At such time however (in the Figures 1 through 6 embodiment), the wedge elements 85 were resting on the retainer or stop ring 90, with the inertia hammer 124 resting on the internal shoulder 122 of the plunger, so that adjustments responsive to spring 68 left these parts undisturbed relatively to one another. In other words, the conical circumferential clutch clearance about the wedge elements 85 remained in status quo from the Figure 2 broken line position of cam 12 until shortly before said cam arrived at the Figure 5 position thereof. Therefore, as was explained in more detail, locking of the piston and plunger was effected immediately after said piston began its ascent to open the selected engine valve.

Reverting now first to Figure 7, it will be noted that the provision of compression spring 138 and washer element 140 preconditions the clutch assembly for instantaneous locking of the piston 52 and plunger 66 the moment said piston begins to rise to the illustrated position. The spring 138 is light in comparison with the spring 68, having only sufficient biasing force to place the wedge elements 85 in contact, but not in clutching engagement, with the conical clutch cavity 74 of plunger 66, and to sustain the static weight of the hammer atop said wedge elements. In consequence, the automatic adjusting action by the spring 68 took place during the interval obtaining between clutch disengagement responsive to hammer descent, and the instantaneously subsequent positioning of the wedge elements as shown while piston 52 was riding along the base circle portion 44 of cam 12. Obviously also, with this arrangement, split collar 86 and the recesses 88 may be eliminated, in that the spring supported washer 140 maintains the wedge elements in proper relative disposition at all times.

Reverting now to the Figure 8 embodiment, it is not deemed necessary to elaborate further on its operation, since it operates in substantially the same manner as the Figure 7 embodiment, with the lower end of the spring 138 seated against the bottom wall of a resilient cup-shaped member 142 to provide uniform tension against the wedge elements, while in the embodiment of Figure 7, the tension of spring 138 is modulated by relative adjustments between the piston 52 and plunger 66. The cylindrical side wall of the member 142, is divided into a circular series of spaced sections each terminating at the top in an outwardly projecting flange. As illustrated, these flanges are seated in the internal annular groove provided in the plunger 66, which groove in the other embodiments serves to retain the stop ring 90. It should be evident that with this sectional side wall and flange arrangement, installation of the cup member 142 is facilitated.

Adequate lubrication is provided for smooth and quiet operation via passage 136, annular recess 134, ports 62, annular recess 94, radial passageways 98, longitudinal passage 80, diametrical port 84, and drainage ports 64. It is noted that oil entering the engine passage 136 is bypass oil from the camshaft bearings, and therefore not under pressure.

From the foregoing description and in view of the drawings, it should be manifest that my invention provides a novel and ingenious valve lifter unit adapted to achieve its objectives in a highly efficient manner.

It is to be understood however, that I do not desire to be restricted to the precise structural details illustrated and described, my invention contemplating any and all modifications thereof, and such equivalents, as may fall within the scope of the appended claims.

I claim as my invention:

1. A mechanical valve lifter assembly interposed in an internal-combustion engine between a cam on the camshaft and the push rod or stem of a poppet valve operating linkage, said assembly including in combination: a cup-shaped piston actuatable by said cam; a plunger slidable in the piston; a cap member on the plunger in engagement with the lower extremity of said push rod; compression spring means for biasing the plunger upwardly in said piston; means supported adjacent the top of the piston for limiting the upward movements of the plunger; and clutch means comprising a plurality of circumferentially spaced wedge-shaped elements for interlocking said piston and plunger for unison movement thereof responsive to limited cam-actuation of the piston relatively to the plunger, prior to opening a selected valve.

2. A mechanical valve lifter assembly interposed in an internal-combustion engine between a cam on the camshaft and the push rod or stem of a poppet valve operating linkage, said assembly including in combination: a cup-shaped piston actuatable by said cam; a plunger slidable in the piston; a cap member on the plunger in engagement with the lower extremity of said push rod; compression spring means for biasing the plunger upwardly in said piston; means supported adjacent the top of the piston for limiting the upward movements of the plunger; clutch means comprising a plurality of circumferentially spaced wedge-shaped elements for interlocking said piston and plunger for unison movement thereof responsive to limited cam-actuation of the piston relatively to the plunger, prior to opening a selected valve; and a series of inter-communicating ports and passages provided in said piston and plunger for lubricating the assembly by means of oil not under pressure.

3. A mechanical valve lifter assembly interposed in an internal-combustion engine between a cam on the camshaft and the push rod or stem of a poppet valve operating linkage, said assembly including in combination: a cup-shaped piston actuatable by said cam; a plunger slidable in the piston; a cap member on the plunger in engagement with the lower extremity of said push rod; compression spring means for biasing the plunger upwardly in said piston; means supported adjacent the top of the piston for limiting the upward movements of the plunger; clutch means comprising a plurality of circumferentially spaced wedge-shaped elements for interlocking said piston and plunger for unison movement thereof responsive to limited cam-actuation of the piston relatively to the plunger, prior to opening a selected valve; and means effective for unlocking the clutch means for independent movement of the piston and plunger upon closure of said valve.

4. The lifter assembly set forth in claim 3, and means for lubricating said assembly by means of bypass oil from the engine pressure lubricating system, said means including an annular external recess formed in the piston, a similar recess formed in the plunger, a plurality of radial ports in the piston establishing fluid communication between said recesses, a plurality of radial passages establishing fluid communication between the recess and the interior of said plunger, and a plurality of radial drainage ports in the piston for draining the oil from said assembly.

5. The lifter assembly set forth in claim 3, wherein the cap member on the plunger in engagement with the lower extremity of the push rod includes: a cylindrical body provided with an annular flange portion overlying the upper end of said plunger and terminating in an integral upwardly projecting segment having a socket therein for the reception of the semi-spherical lower extremity of said push rod; an annular recess formed centrally in the lower end face of said body; a longitudinal bore extending from said recess to the socket aforesaid; a series of angularly disposed passageways leading from said bore to atmosphere; and a series of similar passageways leading from said recess to atmosphere; and wherein a conical compression spring is interposed about a stem reciprocably mounted in said longitudinal bore between said recess and a disc rigidly secured to the lower end of said stem.

6. The lifter assembly set forth in claim 3, wherein the clutch means for interlocking the piston and plunger for unison movement thereof to open said valve include: a conical clutch cavity formed in the lower end segment of said plunger; a pin rigidly supported from the bottom wall of said piston and extending upwardly through said cavity; a plurality of conical clutch elements disposed for conjoint reciprocal movements about said pin in the cavity; an internal groove formed in each clutch element; a split collar in frictional engagemnt with said pin and extending into the internal grooves aforesaid of the clutch elements; and a split retainer ring seated in an internal annular groove provided therefor in said lower end segment of the plunger, said ring limiting the movements of the clutch elements in one direction.

7. The lifter assembly set forth in claim 3, wherein the means for unlocking the clutch means for independent movement of the piston and plunger upon closure of said valve comprises a hollow unsupported inertia hammer reciprocable in a cylindrical bore of said plunger.

8. In a mechanical lifter assembly reciprocably mounted in a cylinder portion of an internal combustion engine for effecting the cyclic opening and closing of a spring-loaded poppet valve via a drive linkage responsive to the rotation of the engine crankshaft, the combination of: a cup-shaped piston; a plunger reciprocable in the piston and having a cap member seated on its upper end in engagement with the push rod of said linkage; preloaded compression spring means operatively interposed between a circular projecting flange on the plunger and the end wall of the piston for providing relative adjustments between the plunger and piston responsive to changes in the thermal condition of the engine and to compensate for wear, whereby desirable operational clearance is maintained in said drive linkage; a split retainer ring seated adjacent the upper end of the piston normally in vertically spaced relation to the cap member for limiting relative axial displacement therebetween; wedge-clutch means for automatically effecting a temporary interlock between said piston and plunger immediately prior to opening said valve; and inertia hammer means for automatically beaking said interlock upon closure of said valve to enable relative adjustments aforesaid.

9. In a valve lifter of the character and for the purpose described: outer and inner body members movable relatively to one another; biasing means interposed between said members for accommodating relative movement adjustments therebetween; clutch means interposed between said members operative in response to movements of the outer member toward the inner member for effecting conjoint movement of said members responsive to the inauguration of valve opening operations; and inertia hammer means for rendering the clutch means inoperative upon closure of said valve.

10. In a valve lifter of the character described: a cup-shaped piston reciprocable responsive to the rotation of a cam on the camshaft of an internal-combustion engine; a spring supported plunger slidably mounted in the piston for limited axial movements therein; a conical clutch cavity in the lower portion of the plunger; a conical wedge-clutch assembly mounted in the piston for engaging the clutch cavity; a cap member maintained atop the plunger by the downwardly biased push rod of a valve drive linkage; a bore and counterbore in the plunger above the conical clutch cavity; a stem slidable in a central longitudinal bore of the cap member, and normally extending into said counterbore of the plunger; a disc rigidly secured to the lower end of the stem; a preloaded conical coil spring interposed in said counterbore about the stem between the cap member and the disc, for normally seating said disc against a shoulder formed in the plunger at the juncture of the bore and counterbore thereof; and an unsupported hammer element reciprocable in said plunger bore and counterbore.

11. In a valve lifter of the character described: the structure recited in claim 10, and a plurality of angularly disposed passageways formed in said cap member establishing communication between the counterbore of said plunger, the longitudinal bore of the cap member, and atmosphere.

12. In a valve lifter of the character described: the structure recited in claim 10, and means for introducing an adequate flow of lubricant into said cup and plunger and for draining it therefrom.

13. In a valve lifter of the character described: the structure recited in claim 10, and means for integrating said structure to form a self-contained unit, said means comprising a split retainer ring seated in an annular groove provided therefor in the inner periphery of said piston adjacent the upper end thereof, the inner peripheral portion of said ring overlying a portion of said cap member.

14. A mechanical valve lifter including in assembly: a cup-shaped piston reciprocable in a cylinder of an internal-combustion engine responsive to the rotation of the engine cam shaft, said piston having a flat end wall and a cylindrical side wall; a threaded socket formed centrally in said end wall; a pin having a reduced threaded shank portion in engagement with said socket; a plunger slidably mounted in said piston and including a lower segment having a conical clutch cavity therein; a preloaded compression spring surrounding said lower segment and interposed between a circular flange on the plunger and the end wall of the piston biasing said plunger in a direction away from said end wall; a bore and a counterbore thereabove in said plunger forming an annular shoulder therein; a tripartite wedge-clutch element assembly mounted on the pin aforesaid in said clutch cavity and movable therein into frictional engagement therewith; a resilient member in yieldable frictional engagement with said pin adapted to maintain the wedge-clutch elements of said tripartite assembly in axial alignment; a split abutment ring for the tripartite assembly seated in an annular recess provided therefor in said lower segment of the plunger conical clutch cavity; an inertia hammer element floatingly reciprocal in said bore and counterbore of the plunger; a cap member for the plunger including a circular flange segment, a spring seat segment, and an upwardly extending socket segment, said cap member being at all times maintained seated atop said plunger responsive to a biasing force existent in the push rod of a conventional valve operating linkage and the disposition of the lower extremity of said rod in the socket segment of said cap member; a disc reciprocable in said counterbore of the plunger; a central bore in the cap member for the slidable reception of the stem member to the lower extremity of which said disc is rigidly secured; and a preloaded conical compression spring interposed about said stem between the disc and the spring seat segment aforesaid normally biasing said disc onto said annular shoulder formed in the plunger.

15. A mechanical valve lifter including in assembly: the structure recited in claim 14, and an annular recess in the piston, a similar recess in the plunger and an optionally dispositioned plurality of longitudinal and radial passageways adapted to adequately lubricate all of the movable elements of said lifter assembly.

16. A mechanical valve lifter including in assembly: the structure recited in claim 14, and pressure relief means to accommodate unhampered reciprocations of said inertia hammer element, said means comprising passageways in the recited cap member leading from the longitudinal bore therein and from the counterbore in the plunger, to atmosphere.

17. A mechanical valve lifter including in assembly: the structure recited in claim 14, and retainer ring means for confining in operative relationship therein the recited structure disposed in said piston.

18. The mechanical valve lifter assembly set forth in claim 14, and a preloaded conical compression spring interposed about the recited pin between the bottom wall of said piston and a washer encompassing said pin and disposed against the underside of the wedge-clutch element assembly.

19. The mechanical valve lifter assembly set forth in claim 14, wherein the recited split abutment ring seated in an annular recess provided therefor in said lower segment of the plunger conical clutch cavity is provided with an integrally formed depending sectioned cup member having a central opening through which the recited pin extends, and wherein a preloaded conical compression spring is interposed about said pin between said cup segment and a washer encompassing said pin and disposed against the underside of the wedge-clutch element assembly.

20. In a mechanical compensating tappet including a tappet body having a longitudinal cylindrical bore closed at one end and open at the other: a cylindrical element secured to and upstanding from the closed end of said bore, a hollow plunger reciprocable in said bore, spring means for axially elongating said tappet body and plunger relatively to each other, a plurality of wedge-clutch elements disposed in surrounding relation with respect to said cylindrical element, a complemental conical clutch face carried by said hollow plunger adjacent one end thereof and disposed for wedging engagement by said wedge-clutch elements to temporarily interlock the tappet body and plunger, and means operatively disposed between said cylindrical element and wedge-clutch elements for effecting said wedging interlock of the tappet body and plunger in response to the lift portion of the tappet cycle.

21. In a mechanical compensating tappet including a tappet body having a longitudinal cylindrical bore closed at one end and open at the other: the structure defined in claim 20, in combination with inertia means disposed superjacent the ends of the reduced section of said wedge-clutch elements for operative impact engagement therewith to break said interlock wedge effect responsive to tappet motion following closure of the engine valve.

22. A mechanical compensating tappet as defined in claim 21, wherein said inertia means includes: a reciprocable element disposed in said hollow plunger, and a snubber spring operatively energized thereby during the lift portion of the tappet cycle to accelerate downward movement of said reciprocable element into impact with the ends of the wedge-clutch elements aforesaid.

23. In a mechanical compensating valve tappet for internal-combustion engines including a cam-actuated tappet body having a longitudinal cylindrical bore closed at one end and open at the other; a clutching surface on the tappet body adjacent its closed end; a hollow plunger reciprocably mounted in said bore and provided with a clutching surface adjacent its inner end; a stop element mounted adjacent the open end of the tappet body to prevent axial displacement of the plunger; preloaded spring means for axially elongating the tappet body and plunger relatively to each other; clutch means having a plurality of elements movably disposed between said clutching surfaces and normally spaced therefrom with one of said surfaces being encircled thereby; means frictionally engaging one of said surfaces for simultaneously moving said clutch elements into clamping engagement with said clutching surfaces to interlock the tappet body and plunger for movement together responsive to tappet body movement during the lift portion of the tappet cycle; and inertia means disposed in the hollow of said plunger for operative energization responsive to the aforesaid lift portion of the tappet cycle to effect ensuing engagement with said clutch elements to break the interlock to enable relative adjustment between the tappet body and plunger upon completion of the tappet cycle.

24. The mechanical compensating valve tappet as defined in claim 23 plus a cap mounted on the outer end of said plunger and a rod forming an operative interconnection between the cap and engine valve whereby the tappet cycle aforesaid is effective to open and close said valve.

References Cited in the file of this patent

UNITED STATES PATENTS

| | | |
|---|---|---|
| 2,120,384 | Wohlfeld | June 14, 1938 |
| 2,158,730 | Russell | May 16, 1939 |
| 2,220,336 | Johnson et al. | Nov. 5, 1940 |